United States Patent

[11] 3,607,313

[72] Inventor: Theodore L. Roth
 Stockton, Calif.
[21] Appl. No.: 767,085
[22] Filed: Oct. 14, 1968
[45] Patented: Sept. 21, 1971
[73] Assignee: Freezecoat Incorporated
 Stockton, Calif.

[54] METHOD OF APPLYING AN EDIBLE COATING TO INDIVIDUALLY QUICK-FROZEN FOOD PIECES BY FREEZE ADHERENCE
 1 Claim, 1 Drawing Fig.

[52] U.S. Cl. .................................................. 99/166,
 99/144, 99/168, 99/192, 99/193, 118/9, 118/19
[51] Int. Cl. ..................................................... A23b 7/04,
 A23b 7/16
[50] Field of Search ....................................... 99/166,
 168, 192, 144, 193; 117/109; 118/8, 19, 9, 22–24

[56] References Cited
 UNITED STATES PATENTS

| | | | |
|---|---|---|---|
| 2,504,869 | 4/1950 | Noyes .......................... | 99/193 X |
| 2,876,109 | 3/1959 | Hemery et al. ................ | 99/166 X |
| 3,136,642 | 6/1964 | Backinger et al. ............ | 99/193 |
| 3,419,015 | 12/1968 | Wochnowski ................ | 118/8 X |

*Primary Examiner*—Morris O. Wolk
*Assistant Examiner*—Stephen B. Davis
*Attorney*—Webster & Webster

ABSTRACT: Individual food pieces are quick-frozen and transfered to a zone where they are subjected to turbulence while being sprayed with sauce. The quantity of sauce sprayed is proportioned by the quantity of food entering the zone. The sauce is prepared by mixing various ingredients, homogenizing a portion, and chilling the combined sauce so that it freeze adheres to the food pieces when sprayed.

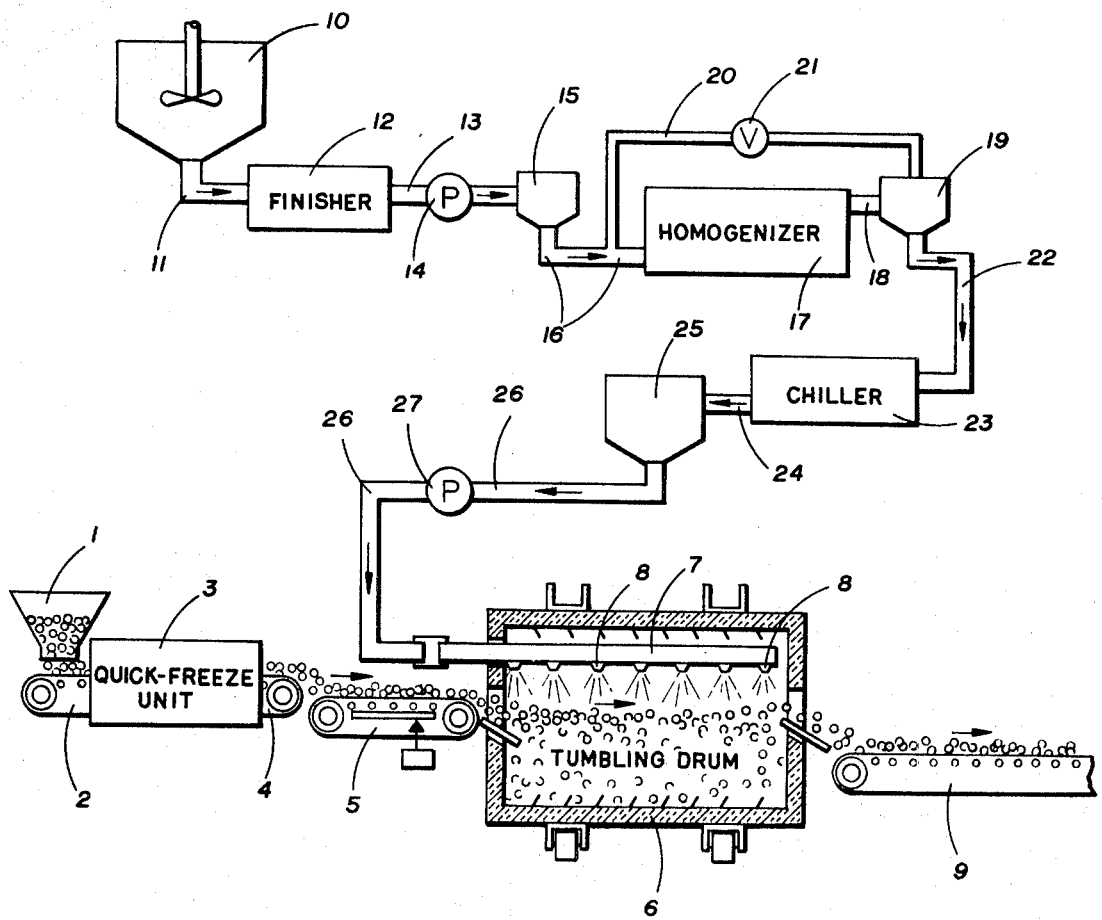

METHOD OF APPLYING AN EDIBLE COATING TO INDIVIDUALLY QUICK-FROZEN FOOD PIECES BY FREEZE ADHERENCE

BACKGROUND OF THE INVENTION

Heretofore it has been the practice to merely introduce a quantity of the sauce into the package containing the individually quick-frozen food pieces; this without regard to the physical distribution of the sauce in the package and wholly absent individual coating of such food pieces. Frequently, under the above practice, the sauce as frozen in the package took the form of a lump or chunk and which was not attractive when the food pieces were contained in a transparent package. The present invention was conceived by me in connection with efforts to improve not only the appearance, but also the quality of individually quick-frozen foods prepared and sold with a sauce included in the package, and which is frequently a clear plastic envelope.

SUMMARY OF THE INVENTION

The present invention provides, as a major object, a novel method of applying to individually quick-frozen and discrete food pieces, comprised of whole or cut vegetables or fruit, an edible coating such as a flavoring sauce; the coating, which is an initially liquid but freezable material, being applied to the individually quick-frozen and discrete food pieces by subjecting them to turbulence—as by tumbling—and simultaneously spraying the initially liquid coating material, in proportioned quantity, onto said food pieces whereupon the extreme cold thereof causes effective freeze adherence of such material as a coating. With food pieces so prepared, and when sold in suitable packaging, the customer may use only a portion of the total amount and retain the balance in frozen storage; said portion, when cooked, having—without more—the proper proportionate quantity of sauce therewith.

The present invention provides, as another object, a method of producing individually quick-frozen food pieces with an edible coating, as in the preceding paragraph, wherein the proportioning of the initially liquid coating material relative to the food pieces is effectively controlled in a manner which includes feed regulation of the food pieces, flow regulation of the coating material, and variable retention time in the spraying zone.

The present invention provides, as still another object, a method of producing individually quick-frozen food pieces with an edible coating, as above, which includes a novel succession of steps of preparing and delivering the initially liquid coating material to the point of spraying and at a reduced temperature.

The present invention provides, as an additional object, a method of producing individually quick-frozen food pieces with an edible coating, which—while especially adapted for coating such food pieces with an edible flavoring sauce—is also useful in applying other types of material as for exampel—but without limitation—a sucrose and dextrose coating on individually quick-frozen fruit.

The present invention provides, as a still further object, a practical and reliable method of applying an edible coating to individually quick-frozen food pieces by freeze adherence.

These objects are accomplished in the manner as will fully appear by a perusal of the following specification and claims.

BRIEF DESCRIPTION OF THE DRAWING

The drawing is a flowsheet illustrating the preferred steps employed in the practice of the method.

DESCRIPTION OF THE PREFERRED EMBODIMENT

Referring now more particularly to the drawing and to the characters of reference marked thereon, the novel method of the present invention is herein described—for the purpose of illustrative disclosure—as practiced in connection with the application of an initially liquid butter sauce to individually quick-frozen fresh garden peas by freeze adherence; the apparatus employed being substantially conventional.

From a hopper 1 the shelled and washed peas are fed onto an endless belt conveyor 2 which delivers to an instant freezing unit 3 wherein the peas are individually quick-frozen at extremely low temperature; the quick-frozen peas being carried out of the freezing unit 3 on an endless belt conveyor 4. From this point forward, the peas remain in frozen condition and discrete.

The conveyor 4 feeds the peas onto an endless-belt type automatic weighing scale conveyor 5 which, in turn, feeds such peas in a constantly weight-controlled flow through the receiving end of and into an insulated, rotary tumbling drum 6 suitably supported and driven. Such tumbling drum 6 is of a variable-speed and variable-inclination type such that it may be adjusted to increase or decrease the retention time of the peas in said tumbling drum 6.

A horizontal spray bar 7 extends into the tumbling drum 6 from one end and adjacent the top thereof; such spray bar being provided at the bottom and throughout its length with a multiplicity of spaced, downwardly facing spray nozzles 8. The spray bar is constantly fed, during operation of the tumbling drum 6, with an initially liquid, but freezable, reduced temperature butter sauce under relatively high pressure and whose flow is constant and proportioned to the quantity of individually quick-frozen peas being introduced into the tumbling conveyor drum 6 by the automatic weighing scale conveyor 5.

The manner in which the initially liquid butter sauce is prepared and delivered to the spray bar 7 will hereinafter be described.

As the reduced-temperature butter sauce emits under relatively high pressure from the spray nozzles 8, the individually quick-frozen peas—in a condition of turbulence in the tumbling drum 6 and which defines the spray zone—are effectively surface-coated with such sauce which immediately becomes solid and remains on the peas by virtue of freeze adherence thereto and which occurs by reason of the low temperature thereof.

The individually quick-frozen peas, with the freeze-adhered butter sauce thereon, discharge from the tumbling drum 6 at the end opposite the automatic weighing scale conveyor 5, whence such peas fall upon and are carried away by an endless-belt conveyor 9 which delivers the product either to bulk storage or to a predetermined point for packaging.

All of the foregoing is under temperature conditions necessary for maintenance of the frozen condition of the product.

The initially liquid butter sauce is prepared and delivered to the spray bar 7 in the preferred manner now to be described.

The sauce ingredients (which include butter, gelatinized starch, spices, and water in predetermined proportions) are power-mixed in a tank 10, whence the liquid sauce flows through a pipe 11 to a screen-type finisher 12 which removes all lumps and reduces the sauce to a smooth consistency.

From the finisher 12, the sauce is carried by a pipe—having a pump 14 interposed therein—to a surge tank 15 from which the sauce is fed by a pip 16 to a homogenizer 17 wherein all but a relatively small portion of the sauce is homogenized; the sauce thence delivering through a pipe 18 to a surge tank 19.

A pipe 20, having an adjustable valve 21 therein, connects between the pipe 16 and surge tank 19 in bypassing relation to the homogenizer 17; the purpose being to bypass a small portion of the sauce and carry it forward without homogenization so that a certain amount of visible butter globules remain in the sauce to enhance the appearance of the ultimate product.

From the surge tank 19, the sauce is fed by a pipe 22 to a swept-surface chiller 23 wherein the sauce is materially reduced in temperature as, for example, to 28° to 30° F.; the outflow from the swept-surface chiller 23 being carried by a pipe 24 leading to a surge tank 25.

A pipe 26 leads from the surge tank 25 and connects to and feeds the spray bar 7; there being a selectively variable, but positive displacement pump 27 interposed in pipe 26 so that the reducedmtemperature sauce is delivered to the spray bar 7 at relatively high pressure and in a constant volume proportioned to the amount of individually quick-frozen peas being fed into the rotary tumbling drum 6 by the weighing scale conveyor 5.

With the herein described method, an edible coating can be effectively and rapidly applied by freeze-adherence to individually quick-frozen food pieces, with such edible coating proportioned to the food pieces within quite close limits; such proportioning being attained by virtue of the controls afforded by the weighing scale conveyor 5 and the selectively variable, positive displacement pump 27.

Whether the individually quick-frozen food pieces be of a kind ready to cook or otherwise useable merely upon thawing, the instant method provides an ultimate product which is most attractive in its appearance, of enhanced eating quality, and useable in any portion (of a whole with the sauce present in proper proportion.

From the foregoing description, it will be readily seen that there has been produced such a method as substantially fulfills the objects of the invention, as set forth herein.

I claim:

1. A method of applying an edible coating to individually quick-frozen food pieces, comprising the successive steps of individually quick-freezing food pieces, subjecting such individually quick-frozen food pieces to a certain motion in a given zone, applying an initially liquid but freezable edible material to the food pieces while the latter continue in motion in said zone, such applied material surface-coating the food pieces and remaining thereon by freeze adherence, and then removing the frozen surface-coated food pieces from said zone; the initially liquid material being a sauce prepared and delivered to said zone by first mixing ingredients of the sauce, passing the mixed sauce through a finisher, then passing the sauce through a homogenizer except for bypassing the latter with a portion of the sauce, combining the two portions of the sauce, subjecting the sauce to a chiller to reduce the temperature of the sauce, and then pumping the reduced-temperature sauce to said zone for application to the individually quick-frozen food pieces in motion thereat.